United States Patent
Yagi et al.

[15] 3,684,789
[45] Aug. 15, 1972

[54] PROCESS FOR PRODUCTION OF BUTADIENE POLYMER

[72] Inventors: Yoshiharu Yagi, Osaka; Akira Kobayashi, Nishinomiya; Itsuro Hirata, Osaka, all of Japan

[73] Assignee: Sumitomo Chemical Co., Ltd., Osaka-fu, Japan

[22] Filed: April 10, 1970

[21] Appl. No.: 27,420

[30] Foreign Application Priority Data

April 10, 1969 Japan ..................... 44/27917

[52] U.S. Cl. ............................................... 260/94.3
[51] Int. Cl. ........................... C08d 1/14, C08d 3/06
[58] Field of Search ................................... 260/94.3

[56] References Cited

UNITED STATES PATENTS 3,379,706   4/1968   Wilke ........................ 260/94.3
3,468,866   9/1969   Alferov et al. ............. 260/94.3
3,510,466   5/1970   Lugli et al. ................ 260/94.3

OTHER PUBLICATIONS

"Friedel–Crafts and Related Reactions," Olah, Interscience Publishers, N.Y., N.Y. (1963), (pp. 312–313) Vol. I Primary Examiner—Joseph L. Schofer
Assistant Examiner—Richard A. Gaither
Attorney—Craig, Antonelli, Stewart & Hill

[57] ABSTRACT

Process for production of butadiene polymer containing predominantly cis-1,4 structure which comprises polymerizing butadiene in the presence of a catalyst system consisting essentially of (1) at least one of nickel and cobalt compounds, (2) trialkyl aluminum and (3) at least one of the benzoquinone compounds represented by either one of the formulas:

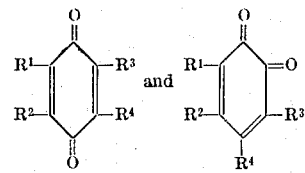

wherein at least two of $R^1$, $R^2$, $R^3$ and $R^4$ are selected from halogen atoms of same or different kind of cyano groups and others are each hydrogen, halogen or cyano, or the combinations of $R^1$ with $R^2$ and/or of $R^3$ and with $R^4$ may represent an aromatic condensed ring(s) and the remaining ones are, if any, each hydrogen, halogen or cyano in a liquid medium at a temperature from −30° to 150°C.

8 Claims, No Drawings

PROCESS FOR PRODUCTION OF BUTADIENE POLYMER

The present invention relates to a process for production of butadiene polymer. More particularly, it relates to a process for production of butadiene polymer containing predominantly cis-1,4 structure by use of a new catalyst system.

The known catalyst system for production of butadiene polymer, particularly containing predominantly cis-1,4 structure, are classified as follows: (1) the system consisting essentially of a halogenated titanium compound and alkyl aluminum, (2) the system consisting essentially of a halogenated cobalt compound and alkyl aluminum halide and (3) the system consisting essentially of a nickel or cobalt compound, alkyl aluminum and a halogenated inorganic compound as Lewis acid.

Among these catalyst systems, the one using as the central metal species a transition metal of Group VIII of the Periodic Table, particularly the ternary catalyst system 3 as mentioned above, has been highly evaluated, because of its high catalytic activity and various advantageous characteristics on its manufacturing processes. For instance, the ternary catalyst system has been acknowledged to be industrially useful for stereoregular polymerization, particularly cis-1,4 polymerization, of butadiene.

In such catalyst system, the third component has much influeneces on the catalytic activity and the stereoregularity as well as the physical properties of the product, and thus the selection of an appropriate substance as the third component is quite important. In fact, the use of the halogen-containing inorganic compounds with a generally known Lewis acid properties (e.g. boron trifluoride or its ether complex, titanium tetrachloride or vanadyl chloride) as the third component to be incorporated into the catalyst system comprising a nickel species and trialkyl aluminum has been proposed.

As the result of the study on various catalyst systems for polymerization of butadiene, it has been found that the use of a novel catalyst system consisting essentially of a nickel or cobalt compound, trialkyl aluminum and a benzoquinone compound in such polymerization affords the rubber-like polymer containing predominantly cis-1,4 structure in an excellent yield. As mentioned above, the use of a halogenated inorganic compound as the third component is known. But, any organic compound has neither been used as the third component nor subjected to consideration for such use. The present invention is based on the said finding.

According to the present invention, there is provided a process for producing butadiene polymer which comprises polymerizing butadiene in the presence of a catalyst system consisting essentially of (1) at least one of nickel and cobalt compounds, (2) trialkyl aluminum and (3) at least one of the benzoquinone compounds represented by either one of the formula:

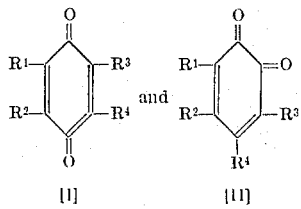

[I] [II]

wherein at least two of $R^1$, $R^2$, $R^3$ and $R^4$ are selected from halogen atoms of same or different kind (e.g. chlorine, bromine, iodine, fluorine) or cyano groups and others are each hydrogen, halogen (e.g. chlorine, bromine, iodine, fluorine) or cyano, or the combinations of $R^1$ with $R^2$ and/or of $R^3$ with $R^4$ may represent an aromatic condensed ring(s) (e.g. benzene, naphthalene, anthracene) and the remaining ones are, if any, each hydrogen, halogen (e.g. chlorine, bromine, iodine, fluorine) or cyano.

As the nickel and cobalt compounds, there may be employed the ones selected from various salts and organic complex compounds of nickel and cobalt such as nickel halides (e.g. nickel chloride), nickel sulfate, organic acid salts of nickel (e.g. nickel acetate, nickel naphthenate, nickel octanoate), complex compounds of nickel salts (e.g. pyridine-nickel chloride complex, tris(di-pyridyl)nickel chloride, bis(ethylenediamine)nickel sulfate), nickel chelate compounds (e.g. bis-dimethylglyoxymato nickel, bis-ethylacetoacetate nickel, bis-acetylacetonate nickel) and their cobalt alternatives. The use of the nickel compounds is generally preferred.

Examples of the trialkyl aluminum include trimethyl aluminum, triethyl aluminum tri-n-butyl aluminum, triisobutyl aluminum and tri-n-hexyl aluminum.

As the benzoquinone compound [I] or [II], the following compounds are exemplified: p-chloranil, o-chloranil, p-bromanil, o-bromanil, tetraiodo-p-benzoquinone, tetrafluoro-p-benzoquinone, 2,3-dicyano-p-benzoquinone, 2,6-dichloro-p-benzoquinone, 2,3-dichloro-1,4-naphthoquinone, 1,2-naphthoquinone, 1,4-anthraquinone, 9,10-anthraquinone, 1,2-anthraquinone, 9,10-phenanthrenequinone, etc.

In the present invention, the combined use of these three components is essential for exertion of the catalytic activity. No catalytic activity is seen when at least one of them is lacked.

The catalytic activity of the catalyst system of the invention is varied with the mixing ratio of the components, the mixing order of the components, the concentration of each component, the temperature at the preparation of the catalyst system and the like. Of these, the former two have particularly a great influence on the catalytic activity. In general, the molar ratios of the component (2)/the component (3) and the component (1)/the component (2) may be 0.1 to 5.0 and 0.001 to 2, respectively. The nickel or cobalt compound (favorably the nickel compound) as the first component may be used normally in 0.001 to 1 percent by weight to butadiene.

For obtaining the catalyst system of a high activity, the component 1 and the component 3 are first mixed preferably by the aid of a diluent and then the component 2 is incorporated therein in the presence of a very small amount of butadiene. In alternative, the preparation of the catalyst system may be effected by admixing the component 2 with the component 3 and incorporating the component 1 into the resultant mixture in the presence of butadiene or by admixing the component 1 with the component 2 in the presence of butadiene and incorporating the component 3 into the resultant mixture. The thus obtained catalyst system also possesses a high catalytic activity.

In the above procedure for preparation of the catalyst system, the use of butadiene is not necessarily required. In order to elevate the catalytic activity, however, such use is favored.

In the polymerization of butadiene according to the present invention, the reaction should be carried out under substantially anhydrous conditions. Moreover, molecular oxygen or any other material inhibiting the polymerization should not be present in the reaction system.

40°C for 2 hours. To the reaction mixture, benzene containing pheny-β-naphthylamine is added, and the resulting mixture is poured into methanol containing phenyl-β-naphthylamine in about 1 percent concentration while being stirred. The precipitated rubber-like polymer is collected, washed three times with methanol containing phenyl-β-naphthylamine and dried at room temperature under reduced pressure. The results of the analysis of the microstructure of the products according to the Morero's method are shown in Table 1.

TABLE 1

| Number | Catalyst | | | Produced polymer | | | |
| --- | --- | --- | --- | --- | --- | --- | --- |
| | Bisacetyl-acetonate nickel (mmol) | Triethyl aluminum (mmol) | p-Chloranil (mmol) | Yield (g.) | Microstructure (percent) | | |
| | | | | | Cis-1,4 | Trans-1,4 | 1,2- |
| 1 | 0.2 | 1.0 | 0.8 | 7.9 | 88.1 | 7.8 | 5.1 |
| 2 | 0.2 | 1.0 | 1.0 | 9.5 | 94.1 | 4.1 | 5.2 |
| 3 | 0.2 | 2.0 | 2.0 | 9.5 | 88.2 | 6.3 | 5.6 |
| 4 | 0.2 | 4.0 | 4.0 | 10.0 | 89.0 | 6.3 | 5.3 |
| 5 | 0.1 | 2.0 | 2.0 | 9.1 | 88.7 | 5.7 | 5.6 |
| 6 | 0.2 | 1.0 | 1.2 | 4.1 | 89.0 | 5.7 | 5.0 |

Examples of the solvent as a diluent for the catalyst system or a reaction medium for the polymerization are aromatic hydrocarbons (e.g. benzene, toluene, xylene), aliphatic hydrocarbons (e.g. hexane, heptane, benzin), alicyclic hydrocarbons (e.g. cyclohexane, decalin), hydrogenated aromatic hydrocarbons (e.g. tetralin), etc.

The polymerization is carried out by contacting butadiene with the catalyst system in a liquid medium at a temperature from −30° to 150°C, preferably from 0° to 100°C. Each of butadiene and the catalyst system may be supplied to the reaction system in an optional order in the presence or absence of the liquid medium.

The recovery of the produced polymer from the reaction mixture may be performed in a per se conventional manner. For instance, the reaction mixture is poured into a large amount of aqueous or alcoholic medium such as methanol, isopropanol, methanol-acetone or hot water, if necessary, with previous addition of an antioxidant (e.g. phenyl-β-naphthylamine, 2,6-t-butyl-p-cresol) and the precipitate is washed with methanol to obtain a substantially colorless rubber-like polymer.

The butadiene polymer produced by the present invention is rubber-like solid or highly viscous material. The analysis of the microstructure according to the D. Morero's infrared absorption spectrum method [D. Morero et al.: Chim. e Inc., 41, 758(1959)] reveals the content of cis-1,4 structure in more than 85 percent of butadiene unit.

Practical and presently-preferred embodiments of the present invention are shown in the following Examples.

EXAMPLE 1

In a glass-made, pressure-resistant reaction tube, there are charged 30 ml of toluene, a designed amount of bis-acetylacetonate nickel, a designed amount of p-chloranil, 0.7 g of butadiene and a designed amount of triethyl aluminum under an argon atmosphere, and 10.0 g of butadiene are added thereto under cooling. The resultant mixture is subjected to polymerization at The polymerization is carried out in the same manner as above using the catalyst system No. 2 shown in Table 1 but at various temperatures for 2 or 5 hours. The results are shown in Table 2.

TABLE 2

| Reaction conditions | | | Produced polymer | | | | |
| --- | --- | --- | --- | --- | --- | --- | --- |
| Temperature (° C.) | Time (hr.) | Yield (g.) | Microstructure (percent) | | | [η]* |
| | | | Cis-1,4 | Trans-1,4 | 1,2- | |
| 50 | 2 | 10 | 88.5 | 9.6 | 5.2 | |
| 40 | 2 | 9.5 | 93.8 | 4.1 | 5.2 | 1.02 |
| 30 | 2 | 7.8 | 94.5 | 5.1 | 5.2 | |
| 20 | 5 | 10 | 95.8 | 5.5 | 5.1 | |
| 10 | 5 | 9.8 | 96.4 | 5.4 | 5.1 | 0.65 |

*[η]:intrinsic viscosity in xylene at 70° C. (dl./g.).

EXAMPLE 2

In a reaction tube, there are charged 30 ml of toluene, 1.0 m mol of triethyl aluminum, 1.0 m mol of p-chloranil and 0.7 g of butadiene in argon stream, and 0.2 m mol of bis-acetylacetonate nickel is added thereto. After addition of 10 g of butadiene under cooling, the polymerization is carried out at 40°C for 2 hours. The reaction mixture is treated as in Example 1 to give 8.3 g of the rubber-like polymer, of which the microstructure is as follows: cis-1,4, 93.1 percent; trans-1,4, 4.1 percent; 1,2-, 5.2 percent.

EXAMPLE 3

The polymerization is carried out as in Example 1 but using 0.2 m mol of bis-ethylacetoacetate nickel, 1.0 m mol of triethyl aluminum and 1.0 m mol of p-chloranil to give 9.3 g of the rubber-like polymer, of which the microstructure is as follows: cis-1,4, 91.9 percent; trans-1,4, 4.7 percent; 1,2-, 5.0 percent.

EXAMPLE 4

The polymerization is carried out as in Example 1 but using 0.2 m mol of bis-acetylacetonate nickel, 1.5 m mol of triisobutyl aluminum and 1.0 m mol of p- chloranil to give 8.5 g of the rubber-like polymer, of which the microstructure is as follows: cis-1,4, 92.8 percent; trans-1,4, 5.4 percent; 1,2-, 4.9 percent.

EXAMPLE 5

The polymerization is carried out as in Example 1 but using 1.0 m mol of bis-acetylacetonate nickel, 3.0 m mol of triethyl aluminum and 3.0 m mol of the third component as shown in Table 3 to give the rubber-like polymer, of which the microstructure is shown in Table 3.

TABLE 3

| Third component | Produced polymer | | | |
|---|---|---|---|---|
| | Yield (g.) | Microstructure (percent) | | |
| | | Cis-1,4 | Trans-1,4 | 1,2- |
| (Br,Br,Br,Br-benzoquinone) | 8.5 | 86.7 | 7.5 | 4.7 |
| (dichloronaphthoquinone) | 6.0 | 95.2 | 4.2 | 4.9 |
| (tetrachlorobenzoquinone) | 2.7 | 90.6 | 7.2 | 5.0 |

EXAMPLE 6

In a reaction tube, there are charged 30 ml of toluene, 0.2 m mol of tris-acetylacetonate cobalt and 0.7 g of butadiene, and 2.0 m mol of triethyl aluminum and 2.0 m mol of p-chloranil are added thereto. After cooling, 10 g of butadiene are added, and the resultant mixture is subjected to polymerization at 40°C for 2 hours. The reaction mixture is treated as in Example 1 to give 2.4 g of the rubber-like polymer, of which the infrared absorption spectrum reveals the content of cis-1,4 structure in more than 90 percent.

What is claimed is:

1. A process for production of butadiene polymer which comprises contacting butadiene with a catalyst system consisting essentially of (1) at least one of nickel and cobalt compounds, (2) trialkyl aluminum and (3) at least one of the benzoquinone compounds represented by either one of the formulas:

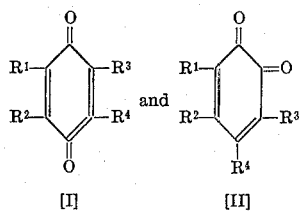

wherein at least two of $R^1$, $R^2$, $R^3$ and $R^4$ are selected from halogen atoms of same or different kind or cyano groups and the others are each hydrogen, halogen or cyano, or the combinations of $R^1$ with $R^2$ and/or of $R^3$ with $R^4$ is an aromatic condensed ring(s) and the remaining substituents are, if any, each hydrogen, halogen or cyano to give a butadiene polymer containing predominantly cis-1,4 structure.

2. The process according to claim 1, wherein the polymerization is carried out in a liquid medium.

3. The process according to claim 1, wherein the polymerization is carried out at a temperature from −30° to 150°C.

4. The process according to claim 1, wherein the molar ratios of the component (2)/the component (3) and the component (1)/the component (2) in the catalyst system are 0.1 to 5.0 and 0.001 to 2, respectively.

5. The process according to claim 1, wherein the component 1 is used in 0.001 to 1 percent by weight to butadiene.

6. The process according to claim 1, wherein the nickel and cobalt compounds are those selected from nickel halides, nickel sulfate, organic acid salts of nickel, complex compounds of nickel salts, nickel chelate compounds and their cobalt alternatives.

7. The process according to claim 1, wherein the trialkyl aluminum is selected from the group consisting of trimethyl aluminum, triethyl aluminum, tri-n-butyl aluminum, triisobutyl aluminum and tri-n-hexyl aluminum.

8. The process according to claim 1, wherein the benzoquinone compound is selected from the group consisting of p-chloranil, o-chloranil, p-bromanil, o-bromanil, tetraiodo-p-benzoquinone, tetrafluoro-p-benzoquinone, 2,3-dicyano-p-benzoquinone, 2,6-dichloro-p-benzoquinone, 2,3-dichloro-1,4-naphthoquinone, 1,2-naphthoquinone, 1,4-anthraquinone, 9,10-anthraquinone, 1,2-anthraquinone and 9,10-phenanthrenequinone.

* * * * *